(12) United States Patent
Nagura (10) Patent No.: US 12,487,136 B2
(45) Date of Patent: *Dec. 2, 2025

(54) FORCE SENSOR AND ROBOT EQUIPPED WITH FORCE SENSOR

(71) Applicant: CANON KABUSHIKI KAISHA, Tokyo (JP)

(72) Inventor: Chihiro Nagura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 184 days.

This patent is subject to a terminal disclaimer.

(21) Appl. No.: 18/502,575

(22) Filed: Nov. 6, 2023

(65) Prior Publication Data

US 2024/0077372 A1 Mar. 7, 2024

Related U.S. Application Data

(63) Continuation of application No. 16/845,199, filed on Apr. 10, 2020, now Pat. No. 11,841,287, which is a
(Continued)

(30) Foreign Application Priority Data

Oct. 17, 2017 (JP) .................. 2017-201155

(51) Int. Cl.
*G01L 5/169* (2020.01)
*B25J 13/08* (2006.01)
(Continued)

(52) U.S. Cl.
CPC ............. *G01L 5/169* (2020.01); *B25J 13/085* (2013.01); *G01L 5/164* (2013.01); *G01L 5/165* (2013.01)

(58) Field of Classification Search
CPC .. B25J 13/085; G01L 1/04; G01L 1/12; G01L 1/142; G01L 5/164; G01L 5/165; G01L 5/166; G01L 5/169; G01L 5/226
See application file for complete search history.

(56) References Cited

U.S. PATENT DOCUMENTS 5,035,148 A * 7/1991 Okada .................. G01L 1/18
338/5
6,205,861 B1 3/2001 Lee
(Continued)

FOREIGN PATENT DOCUMENTS

CN 1334919 A 2/2002
CN 1809735 A 7/2006
(Continued)

OTHER PUBLICATIONS

International Search Report issued in Intl. Appln. No. PCT/JP2018/038908 mailed on Nov. 27, 2018. English translation provided.
(Continued)

*Primary Examiner* — Jason Holloway
*Assistant Examiner* — Blake A Wood
(74) *Attorney, Agent, or Firm* — ROSSI, KIMMS & McDOWELL LLP (57) ABSTRACT

A force sensor that quantitatively detects an external force. The force sensor comprises a base unit, a displacement unit displacing by an external force, a first displacement sensor pair including two sets of sensors detecting a relative displacement between the base unit and the displacement unit in a first direction, and a second displacement sensor pair including two sets of sensors detecting a relative displacement between the base unit and the displacement unit in a second direction. Among four quadrants divided by two straight lines along each of the first direction and the second direction wherein, the straight lines passing through a midpoint of the two sets of sensors composing the first
(Continued)

displacement sensor pair, the two sets of sensors composing the second displacement sensor pair are respectively disposed in two quadrants in which the two sets of sensors composing the first displacement sensor pair are respectively disposed.

11 Claims, 7 Drawing Sheets

Related U.S. Application Data continuation of application No. PCT/JP2018/038908, filed on Oct. 12, 2018.

(51) Int. Cl.
*G01L 5/164* (2020.01)
*G01L 5/165* (2020.01)

(56) References Cited

U.S. PATENT DOCUMENTS

| | | |
|---|---|---|
| 6,928,886 B2 | 8/2005 | Meusel |
| 7,226,314 B2 | 6/2007 | Lang et al. |
| 7,240,570 B2 | 7/2007 | McDearmon |
| 7,491,957 B2 | 2/2009 | Kitamura |
| 8,408,075 B2 | 4/2013 | Okada |
| 8,965,577 B2 | 2/2015 | Arimitsu |
| 8,966,996 B2 | 3/2015 | Okada |
| 9,027,417 B2 | 5/2015 | Sato |
| 9,200,969 B2 | 12/2015 | Ueno |
| 9,574,953 B2 | 2/2017 | Sato |
| 9,638,594 B2 | 5/2017 | Sakano |
| 9,707,667 B2 | 7/2017 | Blake |
| 9,816,886 B2 | 11/2017 | Inazumi |
| 2006/0086190 A1 | 4/2006 | Ohsato |
| 2010/0175487 A1 | 7/2010 | Sato |
| 2010/0312394 A1 | 12/2010 | Arimitsu |
| 2011/0005325 A1 | 1/2011 | Yang |
| 2012/0180575 A1 | 7/2012 | Sakano |
| 2013/0341741 A1 | 12/2013 | Brosh |
| 2014/0076066 A1 | 3/2014 | Harrington et al. |

FOREIGN PATENT DOCUMENTS

| | | |
|---|---|---|
| CN | 101292090 A | 10/2008 |
| CN | 101317262 A | 12/2008 |
| CN | 101949749 A | 1/2011 |
| CN | 102589792 A | 7/2012 |
| CN | 102667433 A | 9/2012 |
| CN | 203203740 U | 9/2013 |
| CN | 103430000 A | 12/2013 |
| CN | 103512694 A | 1/2014 |
| CN | 104596678 A | 5/2015 |
| CN | 104677543 A | 6/2015 |
| CN | 105606271 A | 5/2016 |
| DE | 2856319 A1 | 7/1980 |
| DE | 236586 A1 | 6/1986 |
| DE | 10143489 A1 | 4/2003 |
| DE | 102005063022 A1 | 7/2007 |
| DE | 102015116028 B4 | 2/2018 |
| EP | 0381187 B1 | 4/1995 |
| EP | 0549807 B1 | 10/1997 |
| JP | 2007127501 A | 5/2007 |
| JP | 2010281635 A | 12/2010 |
| JP | 2012237570 A | 12/2012 |
| JP | 2016070824 A | 5/2016 |
| JP | 2017062147 A | 3/2017 |
| WO | 2016046031 A1 | 3/2016 |

OTHER PUBLICATIONS

Written Opinion issued in Intl. Appln. No. PCT/JP2018/038908 mailed on Nov. 27, 2018.
Extended European Search Report issued in European Appln. No. 18869367.5 mailed on May 17, 2021.
Notice of Allowance issued in Chinese Appln. No. 201880067124.8 mailed on Nov. 1, 2021.
Office Action issued in U.S. Appl. No. 16/845,199 mailed Jul. 18, 2022.
Office Action issued in U.S. Appl. No. 16/845,199 mailed Dec. 14, 2022.
Office Action issued in U.S. Appl. No. 16/845,199 mailed Mar. 23, 2023.
Notice of Allowance issued in U.S. Appl. No. 16/845,199 mailed Aug. 29, 2023.
Office Action issued in Chinese Appln. No. 201880067124.8 mailed on Feb. 20, 2021. English translation provided.

* cited by examiner

FORCE SENSOR AND ROBOT EQUIPPED WITH FORCE SENSOR

CROSS-REFERENCE TO RELATED APPLICATIONS

This application is a Continuation of U.S. application Ser. No. 16/845,199, filed Apr. 10, 2020, which is a Continuation of International Patent Application No. PCT/JP2018/038908, filed Oct. 12, 2018, which claims the benefit of Japanese Patent Application No. 2017-201155, filed Oct. 17, 2017, all of which are hereby incorporated by reference herein in their entirety.

BACKGROUND OF THE INVENTION

Field of the Invention

The present invention relates to a force sensor that quantitatively detects an external force, and a robot equipped with the force sensor.

Background Art

A force sensor is used as a unit that detects an external force acting on each part of an arm of an industrial robot or a manipulator for medical use. As a force sensor that detects the multi-axis external force, Patent Literature 1 discloses an optical force sensor that quantitatively detects an external force based on multiple displacement information obtained from an optical displacement sensor composed of multiple light receiving element rows. The optical force sensor described in Patent Literature 1, detects the multi-axial displacement including out-of-plane direction displacement with respect to the mounting surface of the optical displacement sensor, so that the thickness of the entire optical force sensor can be reduced.

CITATION LIST

Patent Literature

PTL 1: Japanese Laid-Open Patent Publication (kokai) No. 2010-281635

However, in the optical force sensor described in Patent Literature 1, due to the difference between the coefficient of thermal expansion of the member connecting the position detection unit and the coefficient of thermal expansion of the structural member where the position detection target is fixed, the detected value tends to change with the temperature change.

SUMMARY OF THE INVENTION

The present invention provides a force sensor whose detected value is hardly affected by a temperature change.

The force sensor according to the present invention comprises a base unit, a displacement unit configured to be displaced with respect to the base unit by receiving an external force, a first displacement sensor pair including two sets of sensors that detect a relative displacement between the base unit and the displacement unit in a first direction, and a second displacement sensor pair including two sets of sensors that detect a relative displacement between the base unit and the displacement unit in a second direction intersecting the first direction, wherein among four quadrants divided by two straight lines along each of the first direction and the second direction, the straight lines passing through a midpoint of the two sets of sensors composing the first displacement sensor pair, the two sets of sensors composing the second displacement sensor pair are respectively disposed in two quadrants in which the two sets of sensors composing the first displacement sensor pair are respectively disposed.

Further features of the present invention will become apparent from the following description of exemplary embodiments with reference to the attached drawings.

DESCRIPTION OF THE EMBODIMENTS

Figure 1:
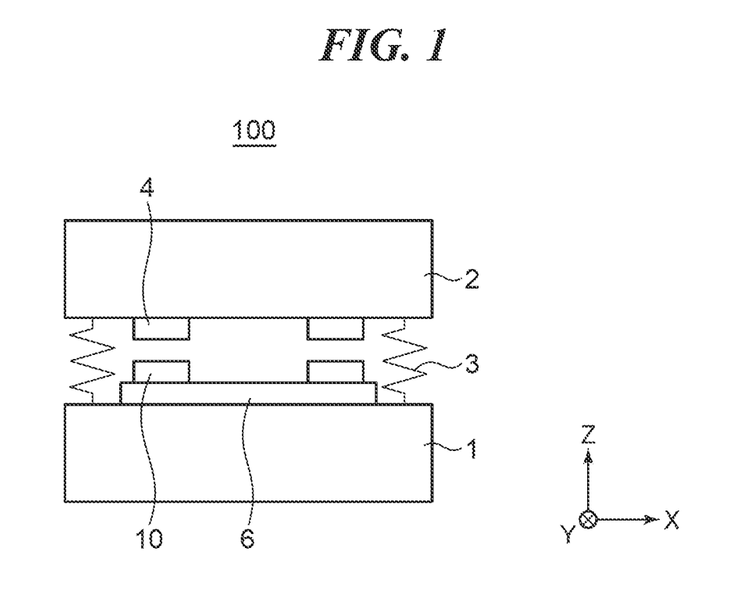
FIG. 1 is a conceptual diagram of a force sensor according to the present invention.

Hereinafter, embodiments of the present invention will be described in detail with reference to the accompanying drawings. FIG. 1 is a conceptual diagram of a force sensor 100 according to the present invention. The force sensor 100 detects an input (applied) external force and outputs a signal corresponding to the detected external force. The force sensor 100 includes a base unit 1, a displacement unit 2, an elastic support unit 3, a scale 4 (a detection target object), a displacement detection unit 10, and a circuit board 6. The shape and the material of the elastic support unit 3 are selected so that the elastic support unit 3 can be elastically deformed in response to an external force acting between the base unit 1 and the displacement unit 2. The elasticity of the elastic support unit 3 is appropriately designed according to the range of the external force to be detected. That is, the elastic support unit 3 is designed so as to have high elasticity so that it is easy to deform, that is, reduce the elastic modulus (elastic coefficient) when detecting minute external force, and to have low elasticity (high elastic modulus) when detecting large external force or when requiring to increase mechanical rigidity.

First Embodiment

Figure 2A:
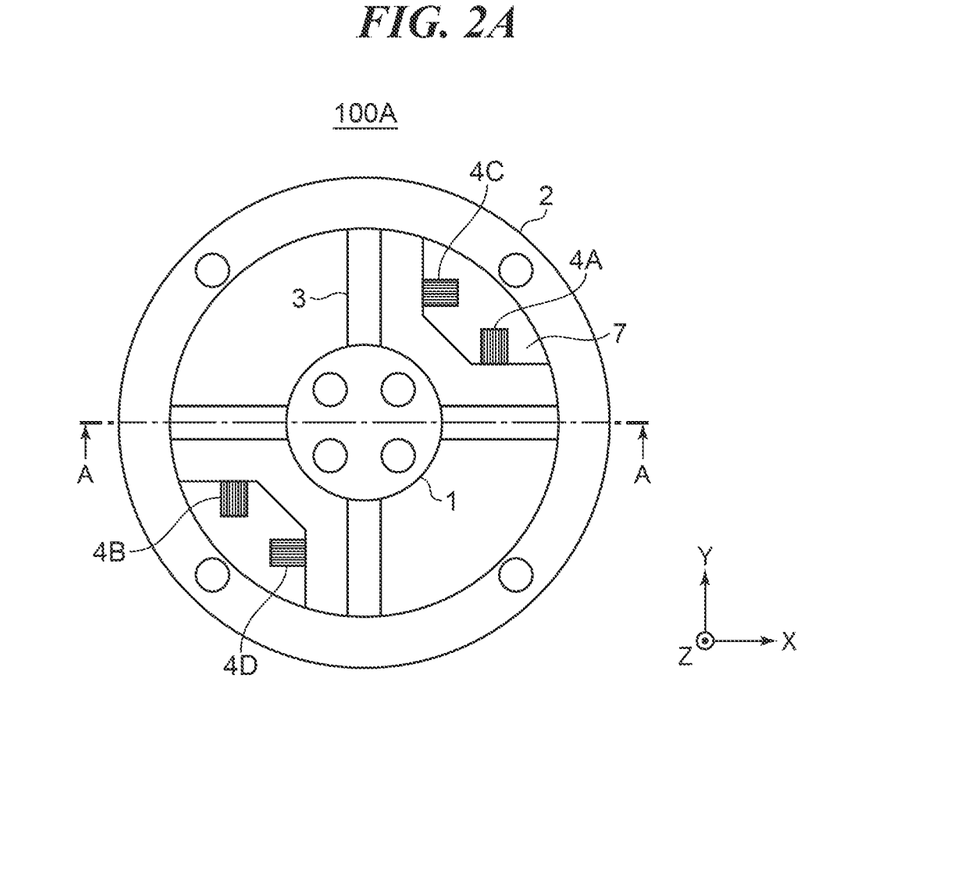
FIG. 2A is a perspective view as viewed from the upper surface side, showing a schematic configuration of a force sensor according to the first embodiment.
Figure 2B:
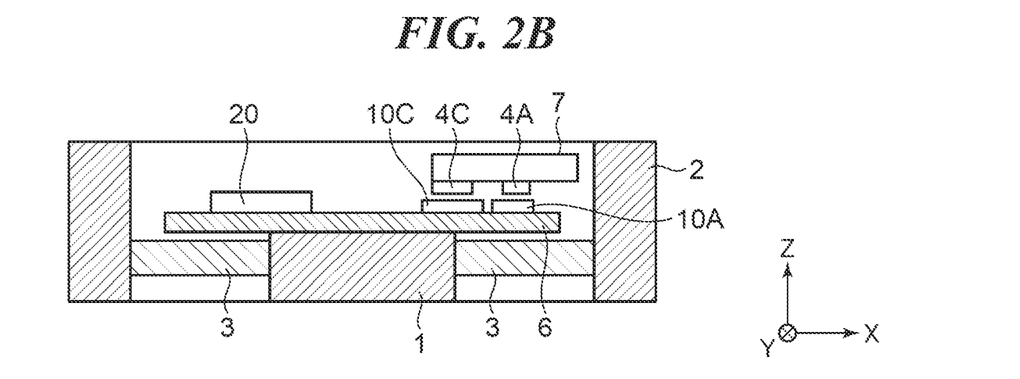
FIG. 2B is a cross-sectional view showing a schematic configuration of the force sensor according to the first embodiment.

FIG. 2A is a perspective view as viewed from the upper surface side, showing a schematic configuration of a force sensor 100A according to the first embodiment of the present invention. FIG. 2B is a cross-sectional view along line A-A shown in FIG. 2A, showing a schematic configuration of the force sensor 100A. A force sensor 100A includes the base unit 1, the displacement unit 2, the elastic support unit 3, the scales 4A to 4D, the circuit board 6, a scale holding unit 7, and the displacement detection units 10A to 10D. It should be noted that for convenience of explanation, as shown in FIG. 2A and FIG. 2B, X, Y, and Z axes that intersect with, more preferably are orthogonal to one another are determined and used for explanation as appropriate.

The displacement unit 2 composing the outer ring portion of the force sensor 100A and the base unit 1 composing the inner ring portion are connected by four elastic support units 3 radially disposed every 90 degrees when viewed from the upper surface side. The circuit board 6 is fixed to the base unit 1. The scale holding unit 7 that holds the scales 4A to 4D is connected to the inner periphery of the displacement unit 2. The scales 4A to 4D are fixed on the surface, of the scale holding unit 7, facing the circuit board 6. The scales 4A to 4D are, for example, formed in a manner of patterning by which a pattern of a chrome reflection film is formed in a grid pattern on a glass substrate.

Figure 3:
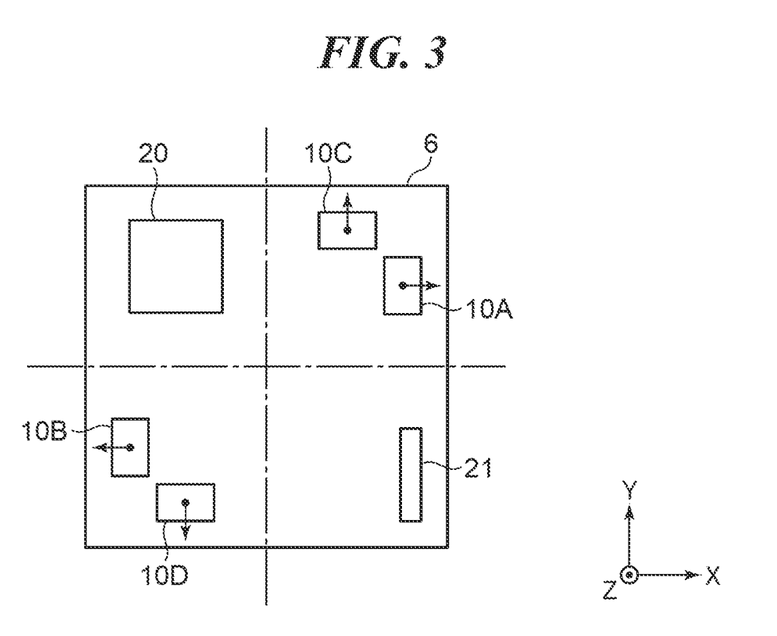
FIG. 3 is a plan view of a circuit board included in the force sensor shown in FIGS. 2A and 2B.

FIG. 3 is a plan view of the circuit board 6. The displacement detection units 10A to 10D are mounted on the circuit board 6 so as to face the scales 4A to 4D (not shown in FIG. 3, see FIGS. 2A, 2B) in the Z direction in a one-to-one manner. The displacement detection unit 10A and the scale 4A compose a set of displacement sensor, and the displacement detection unit 10B and the scale 4B compose a set of displacement sensor. It is defined that these two sets of displacement sensors compose a first displacement sensor pair. The first displacement sensor pair detects the amount of displacement of the displacement unit 2 in the X direction (first direction), as described later. Also, the displacement detection unit 10C and the scale 4C compose a set of displacement sensor, and the displacement detection unit 10D and the scale 4D compose a set of displacement sensor. It is defined that these two sets of displacement sensors compose a second displacement sensor pair. The second displacement sensor pair detects the amount of displacement of the displacement unit 2 in the Y direction (second direction), as described later.

The displacement detection units 10A and 10B are separated from each other by a predetermined distance in each of the X direction and the Y direction, and are disposed at positions that are point-symmetric with respect to the center of the XY plane of the circuit board 6. Further, the circuit board 6 is fixed to the base unit 1 such that the center of the XY plane of the circuit board 6 substantially coincides with the center of the XY plane of the base unit 1 (the center of the XY plane of the force sensor 100A). Therefore, the midpoint of the two sets of displacement sensors composing the first displacement sensor pair substantially coincides with the center of the XY plane of the force sensor 100A. Similarly, the displacement detection units 10C and 10D are separated by a predetermined distance in each of the X direction and the Y direction, and are disposed at positions that are point-symmetric with respect to the center of the XY plane of the force sensor 100A. Therefore, the midpoint of the two sets of displacement sensors composing the second displacement sensor pair substantially coincides with the center of the XY plane of the force sensor 100A. That is, the midpoint of the two sets of displacement sensors composing the first displacement sensor pair substantially coincides with the midpoint of the two sets of displacement sensors composing the second displacement sensor pair.

When the force sensor 100A (circuit board 6) is divided into four quadrants by straight lines along each of the X axis and the Y axis, more preferably straight lines parallel to each of the X axis and the Y axis, where the straight lines pass through the center of the XY plane of the force sensor 100A, the displacement detection units 10A and 10C are disposed in the same quadrant, and the displacement detection units 10B and 10D are disposed in the same quadrant. It should be noted that the quadrant where the displacement detection units 10A and 10C are disposed and the quadrant where the displacement detection units 10B and 10D are disposed have the positional relationship in which they are point-symmetric with respect to the center of the XY plane of the force sensor 100A. In the present embodiment, the four elastic support units 3 are disposed radially from the center of the XY plane every 90 degrees so as to correspond to the two straight lines by which the quadrant is divided into four quadrants. Electrical components such as a signal processing circuit 20 and a connector 21 for outputting a signal from the signal processing circuit 20 are mounted in the quadrant where the displacement detection units 10A to 10D are not mounted.

Figure 4:
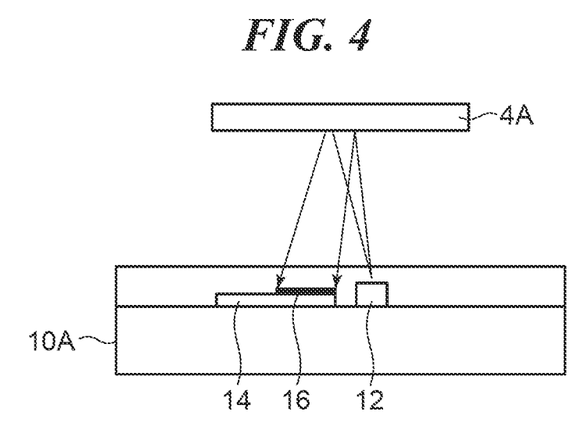
FIG. 4 is a diagram showing a configuration of a displacement detection unit and a method for reading a scale.

FIG. 4 is a diagram showing a configuration of the displacement detection unit 10A and a method for reading the scale 4A by the displacement detection unit 10A. It should be noted that regarding the configurations of the displacement detection units 10B to 10D and the methods for reading the scales 4B to 4D by displacement detection units 10B to 10D, which respectively conform to the configuration of the displacement detection unit 10A and the method for reading the scale 4A by the displacement detection unit 10A, descriptions are omitted.

The displacement detection unit 10A is an integrated light receiving and emitting sensor unit in which a light source 12 and a light receiving IC 14 having a light receiving element array 16 are mounted in the same package. Examples of the light source 12 include a current confinement type LED and a semiconductor laser. The light receiving element array 16 has a structure in which a plurality of light receiving elements (detection elements) that detects the distribution of light from the pattern of the scale 4A are disposed in the moving direction (positioning direction) of the scale 4A. The displacement detection unit 10A detects an amount of relative displacement of the scale 4A by being disposed to face the scale 4A. That is, the divergent light beam emitted from the light source 12 is reflected by the grid pattern on the scale 4A, a stripe-shaped light distribution (interference fringes) is formed on the light receiving element array 16 by diffraction and interference. Respective light receiving elements of the light receiving element array 16 are cyclically assigned in the order of A+ phase, B+ phase, A− phase and B− phase, and a plurality of light receiving elements assigned to each of the four phases compose one light receiving element group. It should be noted that the circulation cycle of the light receiving element is set to match the cycle of the interference fringes.

The light receiving elements composing the light receiving element group are electrically connected to each other, the outputs (currents) are added together, and are input to an IV conversion amplifier (not shown) provided for each phase at a subsequent stage. Each of the four IV conversion amplifiers outputs four-phase signals S1(A+), S1(B+), S1(A−), and S1(B−). The four-phase signals S1(A+), S1(B+), S1(A−), and S1(B−) are voltage signals (sine wave signals) whose values change in a sine wave shape according to the movement of the scale 4A. The output signals of the four IV amplifiers provided for the four phases correspond to the signal phases of 0, 90, 180, and 270 degrees, respectively. The signal processing circuit 20 performs arithmetic processing on the four-phase signals S1(A+), S1(B+), S1(A−), and S1(B−) using the following two equations shown in [Math. 1], and generates the two-phase sine wave signals S1(A) and S1(B) obtained by removing direct current components from the four-phase signals. The two-phase sine wave signals S1(A) and S1(B) thus obtained represent the position information of the scale 4A.

$$S1(A)=S1(A+)-S1(A-),\ S1(B)=S1(B+)-S1(B-) \quad \text{[Math. 1]}$$

Further, the signal processing circuit 20 obtains a phase signal Φ on which the position signal is provided based on, by a calculation expressed by the following [Math. 2]. It should be noted that A TAN 2 [Y, X] is an arc tangent operation function for discriminating a quadrant and transforming it to a phase of 0 to 2π. The phase signal Φ corresponds to the amount of movement of the interference fringes accompanying the movement of the grid pattern on the scale 4A. By accumulating the variation of the phase signal Φ, the amount of relative displacement between the scale 4A and the displacement detection unit 10A can be detected. The displacement detection direction of the displacement detection unit 10A is the direction of the grid period of the grid pattern of the scale 4A. That is, as shown in FIG. 3, the displacement detection direction for the displacement detection units 10A and 10B is the X direction, and the displacement detection directions for the displacement detection units 10C and 10D is the Y direction.

$$\Phi = A\ TAN\ 2[S1(A), S1(B)] \quad \text{[Math. 2]}$$

Subsequently, arithmetic processing for detecting an external force by the force sensor 100A will be described. When putting Da, Db, Dc, and Dd as the outputs from the displacement detection units 10A, 10B, 10C, and 10D respectively, the external force information and the temperature information can be calculated using the equation shown in [Math. 3] below. Fx is an external force in the X direction, Fy is an external force in the Y direction, Mz is a moment about the Z axis, and T is a thermal expansion component. Here, the transformation matrix C is a matrix for transforming the outputs from the displacement detection units 10A to 10D into the three-axis external force components and the thermal expansion component. Letters k, l, and m are coefficients for transforming the amount of displacement into an external force, and may be determined by a design value or may be determined based on an actually measured value.

[Math. 3]

$$\begin{bmatrix} Fx \\ Fy \\ Mz \\ T \end{bmatrix} = C \times \begin{bmatrix} Da \\ Db \\ Dc \\ Dd \end{bmatrix}, \ C = \begin{bmatrix} k & -k & 0 & 0 \\ 0 & 0 & k & -k \\ -l & -l & l & l \\ m & m & m & m \end{bmatrix}$$

The fact that the three-axis external force components and the thermal expansion component are detected independently (separately) at this time will be described below. When the external force Fx of the X direction is input to the force sensor 100A, the displacement detection units 10A and 10B detect the relative displacements of the displacement detection units 10A and 10B with respect to the scales 4A and 4B, respectively. At this time, when putting Da_Fx, Db_Fx, Dc_Fx, and Dd_Fx as the displacement outputs from the displacement detection units 10A to 10D, respectively, the relationship between each displacement output and the amount of displacement p is expressed as the following [Math. 4].

[Math. 4]

$$\begin{bmatrix} Da\_Fx \\ Db\_Fx \\ Dc\_Fx \\ Dd\_Fx \end{bmatrix} = \begin{bmatrix} p \\ -p \\ 0 \\ 0 \end{bmatrix}$$

Similarly, when the external force Fy of the Y direction is input to the force sensor 100A, the displacement detection units 10C and 10D detect the relative displacements of displacement detection units 10C and 10D with respect to scales 4C and 4D, respectively. At this time, when putting Da_Fy, Db_Fy, Dc_Fy, and Dd_Fy as the displacement outputs from the displacement detection units 10A to 10D, respectively, the relationship between each displacement output and the amount of displacement p is expressed as the following [Math. 5].

[Math. 5]

$$\begin{bmatrix} Da\_Fy \\ Db\_Fy \\ Dc\_Fy \\ Dd\_Fy \end{bmatrix} = \begin{bmatrix} 0 \\ 0 \\ p \\ -p \end{bmatrix}$$

When the moment Mz about the Z axis is input to the force sensor 100A, the displacement detection units 10A to 10D detect the relative displacements of the displacement detection units 10A to 10D with respect to the scales 4A to 4D, respectively. At this time, when putting Da_Mz, Db_Mz, Dc_Mz, and Dd_Mz as the displacement outputs from the displacement detection units 10A to 10D, respectively, the relationship between each displacement output and the amount of displacement q is expressed as the following [Math. 6].

[Math. 6]

$$\begin{bmatrix} Da\_Mz \\ Db\_Mz \\ Dc\_Mz \\ Dd\_Mz \end{bmatrix} = \begin{bmatrix} -q \\ -q \\ q \\ q \end{bmatrix}$$

When thermal expansion (temperature change) occurs in the force sensor 100A due to heat transfer to the force sensor 100A, each of the displacement detection units 10A to 10D detects a relative displacement of the displacement detection units 10A to 10D with respect to the scales 4A to 4D. The relative displacement in this case is mainly caused by a difference in amount of thermal expansion between the circuit board 6 and other parts (structures such as the base unit 1, the displacement unit 2, and the elastic support unit 3). As described above, in the force sensor 100A, the circuit board 6 is fixed to the base unit 1 so that the center of the first displacement sensor pair and the center of the second displacement sensor pair substantially coincide with the center of the circuit board 6, and the center of the circuit board 6 substantially coincides with the center of the base unit 1. In this case, the amounts of relative displacement detected by the respective displacement detection units 10A to 10D are substantially equal. Therefore, when putting Da_T, Db_T, Dc_T, and Dd_T as the displacement outputs from the displacement detection units 10A to 10D respectively, the relationship between each displacement output and the amount of displacement r is expressed as the following [Math. 7].

[Math. 7]

$$\begin{bmatrix} Da\_T \\ Db\_T \\ Dc\_T \\ Dd\_T \end{bmatrix} = \begin{bmatrix} r \\ r \\ r \\ r \end{bmatrix}$$

A 4×4 matrix Dmat putting the response to the inputs of the three-axis external force components and the thermal expansion component to the force sensor 100A into one is expressed by the following [Math. 8]. Then, when the transformation matrix C is multiplied by the matrix Dmat, a diagonal matrix expressed by [Math. 9] is obtained.

[Math. 8]

$$Dmat = \begin{bmatrix} Da\_Fx, Da\_Fy, Da\_Mz, Da\_T \\ Db\_Fx, Db\_Fy, Db\_Mz, Db\_T \\ Dc\_Fx, Dc\_Fy, Dc\_Mz, Dc\_T \\ Dd\_Fx, Dd\_Fy, Dd\_Mz, Dd\_T \end{bmatrix}$$

[Math. 9]

$$C \times \begin{bmatrix} Da\_Fx, Da\_Fy, Da\_Mz, Da\_T \\ Db\_Fx, Db\_Fy, Db\_Mz, Db\_T \\ Dc\_Fx, Dc\_Fy, Dc\_Mz, Dc\_T \\ Dd\_Fx, Dd\_Fy, Dd\_Mz, Dd\_T \end{bmatrix} = \begin{bmatrix} 2kp & 0 & 0 & 0 \\ 0 & 2kp & 0 & 0 \\ 0 & 0 & 4lp & 0 \\ 0 & 0 & 0 & 4mr \end{bmatrix}$$

Since the displacement detection units 10A to 10D detect extremely small displacements relative to the size (mechanical size) of the force sensor 100A, the superposition approximation holds for the response to the external force input in each axial direction. Therefore, even when the four components Fx, Fy, Mz, and T are combined and input to the force sensor 100A, the four components can be separately detected. In particular, since the sign relationship of Da, Dc and the sign relationship of Db, Dd are reversed between when Mz is applied and when the thermal expansion occurs, it is possible to separate them with a good SN ratio.

It should be noted that various temperature corrections can be performed using a temperature signal having a strong correlation with thermal expansion. For example, when the center of the circuit board 6 is fixed to the base unit 1 while being shifted from the center of the base unit 1, the separation accuracy of the thermal expansion component T for Fx or Fy, decreases, but correction using the temperature signal is possible. In this case, the transformation matrix C is replaced by the equation expressed by [Math. 10] Here, m' and m" are interference coefficients of the temperature signal to Fx and Fy, respectively. For example, m' and m" may be calculated by obtaining correlation data between the temperature signal and Fx and Fy when the force sensor 100A being shipped.

[Math. 10]

$$C = \begin{bmatrix} k+m' & -k+m' & +m' & +m' \\ m'' & m'' & k+m'' & -k+m'' \\ -l & -l & l & l \\ m & m & m & m \end{bmatrix}$$

Figure 5A:
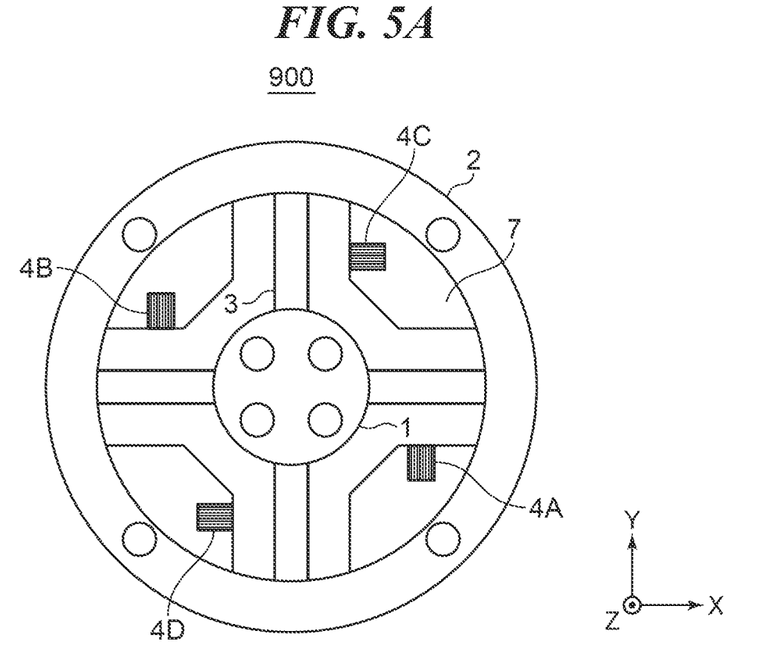
FIG. 5A is a perspective view as viewed from the upper surface side, showing a schematic configuration of a force sensor according to a comparative example.
Figure 5B:
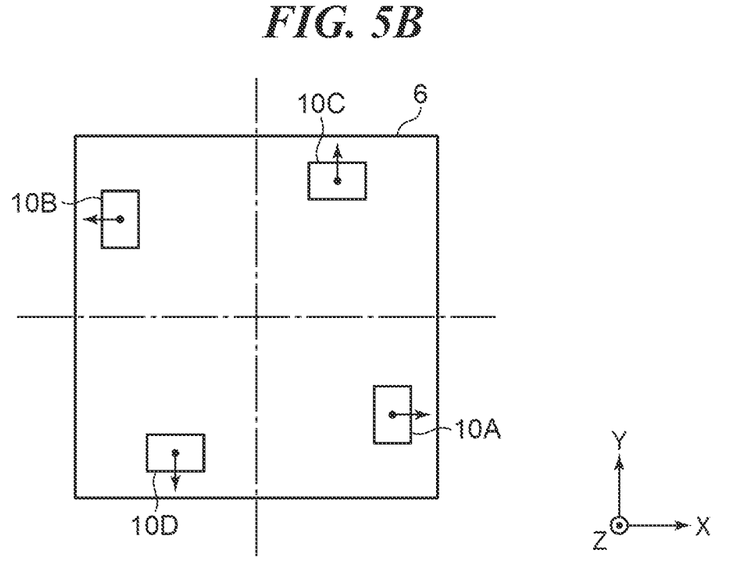
FIG. 5B is a plan view of a circuit board included in the force sensor according to the comparative example.

Here, a force sensor as a comparative example relative to the present invention will be described in comparison with the force sensor 100A described above. FIG. 5A is a perspective view as viewed from the upper surface side, showing a schematic configuration of a force sensor 900 according to the comparative example. FIG. 5B is a plan view of the circuit board 6 provided in the force sensor 900. The components of the force sensor 900 are the same as the components of the force sensor 100A, but the force sensor 900 and the force sensor 100A are different in arrangement positions of the scales 4A to 4D and displacement detection units 10A to 10D. In the force sensor 900, a scale and a displacement detection unit are disposed in each quadrant when the force sensor 900 is divided into four quadrants by straight lines parallel to each of the X axis and the Y axis.

When the external force Fx of the X direction is input to the force sensor 900, the displacement detection units 10A and 10B detect the relative displacements of the displacement detection units 10A and 10B with respect to the scales 4A and 4B, respectively. At this time, when putting Da'_Fx, Db'_Fx, Dc'_Fx, Dd'_Fx as the displacement outputs from the displacement detection units 10A to 10D respectively, the relationship between each displacement output and the amount of displacement p is expressed as the following [Math. 11].

[Math. 11]

$$\begin{bmatrix} Da'\_Fx \\ Db'\_Fx \\ Dc'\_Fx \\ Dd'\_Fx \end{bmatrix} = \begin{bmatrix} p \\ -p \\ 0 \\ 0 \end{bmatrix}$$

When the external force Fy of the Y direction is input to the force sensor 900, the displacement detection units 10C and 10D detect the relative displacements of the displacement detection units 10C and 10D with respect to scales 4C and 4D, respectively. At this time, when putting Da'_Fy, Db'_Fy, Dc'_Fy, and Dd'_Fy as the displacement outputs from the displacement detection units 10A to 10D respectively, the relationship between each displacement output and the amount of displacement p is expressed as the following [Math. 12].

[Math. 12]

$$\begin{bmatrix} Da'\_Fy \\ Db'\_Fy \\ Dc'\_Fy \\ Dd'\_Fy \end{bmatrix} = \begin{bmatrix} 0 \\ 0 \\ p \\ -p \end{bmatrix}$$

When the moment Mz about the Z axis is input to the force sensor 900, the displacement detection units 10A to 10D detect the relative displacements of the displacement detection units 10A to 10D with respect to the scales 4A to 4D, respectively. At this time, when putting Da'_Mz, Db'_Mz, Dc'_Mz, and Dd'_Mz as the displacement outputs from the displacement detection units 10A to 10D respectively, the relationship between each displacement output and the amount of displacement q is expressed as the following [Math. 13].

[Math. 13]
$$\begin{bmatrix} Da'\_Mz \\ Db'\_Mz \\ Dc'\_Mz \\ Dd'\_Mz \end{bmatrix} = \begin{bmatrix} q \\ q \\ q \\ q \end{bmatrix}$$

When thermal expansion (temperature change) occurs due to heat transfer to the force sensor 900, each of the displacement detection units 10A to 10D detects a relative displacement of the displacement detection units 10A to 10D with respect to the scales 4A to 4D. The relative displacement in this case is mainly caused by the difference in amount of thermal expansion between the circuit board 6 and other parts. Also in the force sensor 900, the circuit board 6 is fixed to the base unit 1 such that the midpoint between the displacement detection units 10A and 10B and the midpoint between the displacement detection units 10C and 10D substantially coincide with the center of the circuit board 6, and the center of the circuit board 6 substantially coincides with the center of the base unit 1. In this case, the amounts of relative displacement detected by the respective displacement detection units 10A to 10D are substantially equal. Therefore, when putting Da'_T, Db'_T, Dc'_T, and Dd'_T as the displacement outputs of the displacement detection units 10A to 10D respectively, the relationship with the amount of displacement r is expressed as the following [Math. 14].

[Math. 14]
$$\begin{bmatrix} Da'\_T \\ Db'\_T \\ Dc'\_T \\ Dd'\_T \end{bmatrix} = \begin{bmatrix} r \\ r \\ r \\ r \end{bmatrix}$$

From the above [Math. 13] and [Math. 14], in the case of the force sensor 900, since the displacement detection unit in which displacement occurs due to the moment Mz about the Z axis and the displacement detection unit in which displacement occurs due to thermal expansion are the same, and the displacement caused by the moment Mz about the Z axis and the displacement caused by thermal expansion have the same sign relationship, separation of these components is difficult. In the force sensor 900, since it is not possible to secure a large mounting space on the circuit board 6, mounting large components such as the signal processing circuit 20 and the connector 21 on the circuit board 6 is difficult.

Therefore, the force sensor 100A according to the first embodiment is less susceptible to temperature changes and enables more accurate detection of the external force than the force sensor 900 according to the comparative example. Further, the force sensor 100A according to the first embodiment has a high degree of freedom in component mounting on the circuit board 6, and enables component mounting with high density, so that the size and cost of the circuit board 6 can be reduced, and the size and cost of the entire force sensor 100A can be reduced accordingly.

It should be noted that in the present embodiment, the configuration for optically detecting the displacement of the scales 4A to 4D using the displacement detection units 10A to 10D has been described. The displacement detection method is not limited to the optical method, but other displacement detection methods such as a magnetic type and a capacitance type may be used. For example, when using the magnetic detection method, the configuration may be such that a magnetic material is used for the scale, the magnetic polarity distribution is formed in the same shape as the reflection film of the scale 4A or the like, and the magnetic field detection elements disposed in an array closely face the scale. Thus, displacement of the scale can be detected by detecting a change in the magnetic field by the magnetic field detection element. Also, when using a capacitance type detection method, the configuration may be such that a conductive electrode pattern is formed on the scale in the same shape as the reflection film of the scale 4A, and another array-shaped electrode pattern closely face the scale. Thus, displacement of the scale can be detected by detecting a change in capacitance between the electrode patterns. An array-like scale and an array-like detection unit are not necessarily required, and the external force can be detected when there is at least one detection unit and one scale pattern edge. In this case, the displacement detection direction is the normal direction of the edge in the scale plane.

Second Embodiment

Figure 6A:
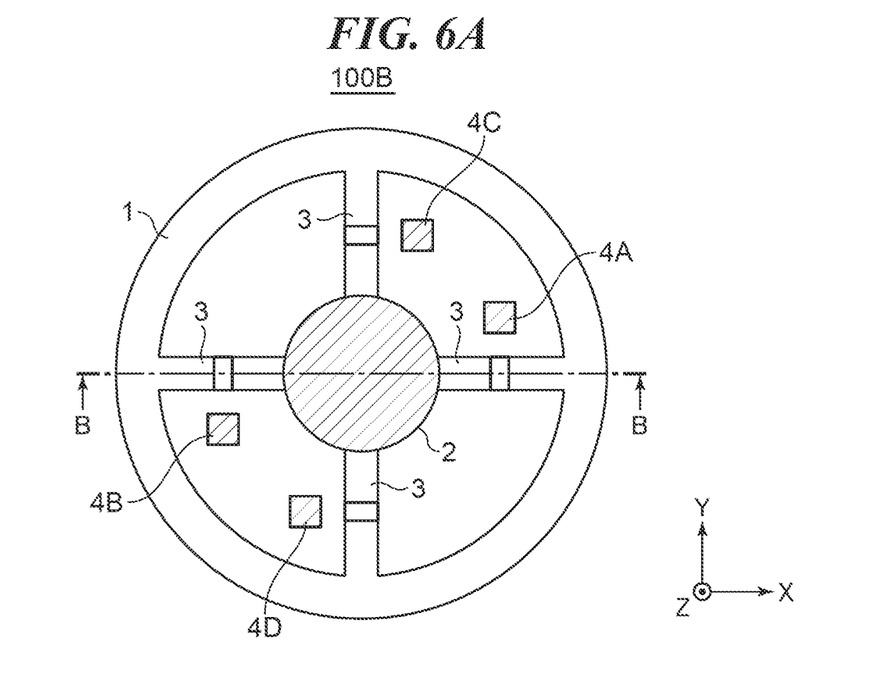
FIG. 6A is a perspective view as viewed from the upper surface side, showing a schematic configuration of a force sensor according to the second embodiment.
Figure 6B:
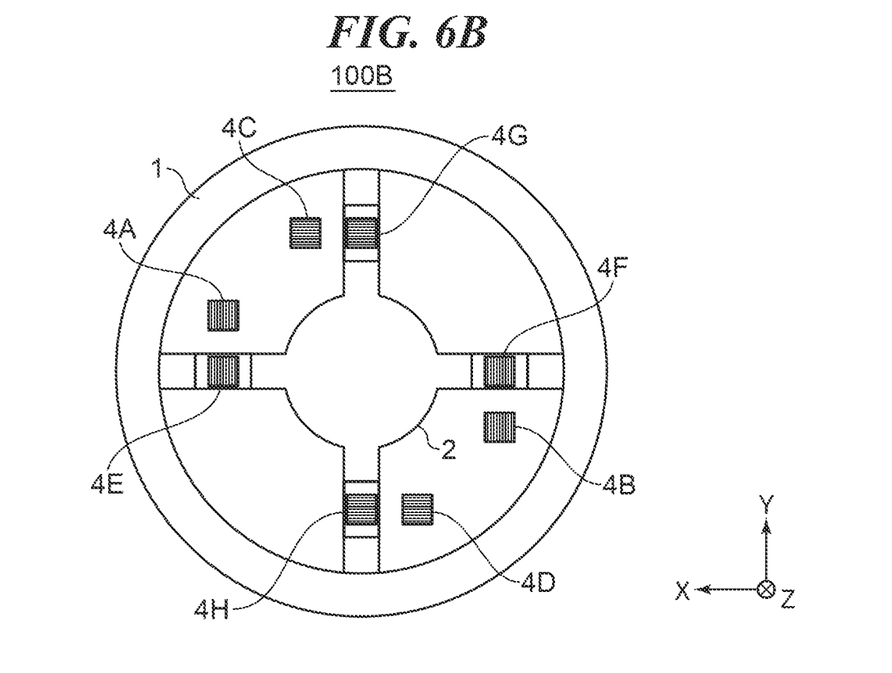
FIG. 6B is a perspective view as viewed from lower surface side, showing a schematic configuration of the force sensor according to the second embodiment.
Figure 7:
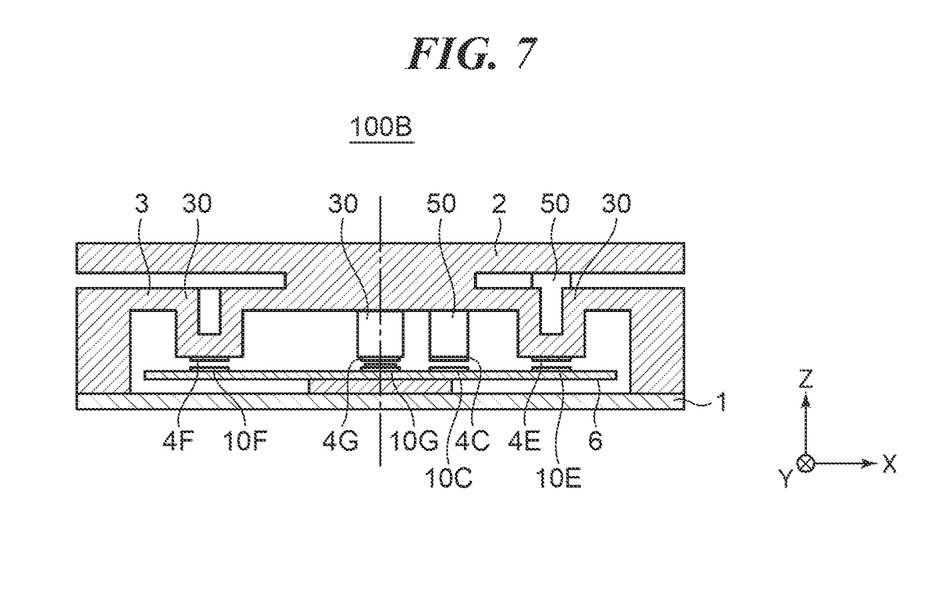
FIG. 7 is a cross-sectional view showing a schematic configuration of a force sensor according to the second embodiment.

FIG. 6A is a perspective view as viewed from the upper surface side, showing a schematic configuration of a force sensor 100B according to the second embodiment. FIG. 6B is a perspective view as viewed from lower surface side, showing the schematic configuration of the force sensor 100B. FIG. 7 is a cross-sectional view showing a schematic configuration of the force sensor 100B taken along line B-B shown in FIG. 6A. Hereinafter, the components same as those of the force sensor 100A will be denoted by the same names and signs, and the duplicate descriptions of the respective components will be omitted. The force sensor 100B includes the base unit 1, the displacement unit 2, the elastic support unit 3, scales 4A to 4H, a circuit board 6, and displacement detection units 10A to 10H. The base unit 1 seals a cylindrical-shaped portion forming the outer periphery of the displacement unit 2, and holds the circuit board 6.

The disposition positions of the scales 4A to 4D on the XY plane in the force sensor 100B conform to the disposition positions of the scales 4A to 4D on the XY plane in the force sensor 100 according to the first embodiment. In the force sensor 100B, four columnar portions 50 protruding in the −Z direction are provided in the displacement unit 2 to dispose the scales 4A to 4D, and one scale is fixed to the distal end surface (the surface facing the circuit board 6) of one columnar portion. When the force in the X direction, the force in the Y direction, or the external force of the moment about the Z axis is input to the displacement unit 2, displacements occurs to the scales 4A to 4D in the XY plane according to the direction of the input force.

The force sensor 100B has a structure in which the elastic support units 3 provided at four locations have a displacement direction conversion function, and the displacement direction conversion function the displacement direction is realized by the U-shaped recess 30. The scales 4E to 4H are disposed such that one scale is fixed to the distal end surface (surface facing the circuit board 6) of each of the four recesses 30. The scales 4E and 4F are disposed at positions that are point-symmetric with respect to the center of the XY plane of the force sensor 100B. Further, the scales 4G and 4H are disposed at positions that are point-symmetric with respect to the center of the XY plane of the force sensor 100B. When a force in the −Z direction is input to the displacement unit 2, the scales 4E to 4H disposed on the recess 30 have displacements in the XY plane. The scales 4A to 4H are disposed at substantially the same height in the Z direction (that is, in the same plane).

Figure 8:
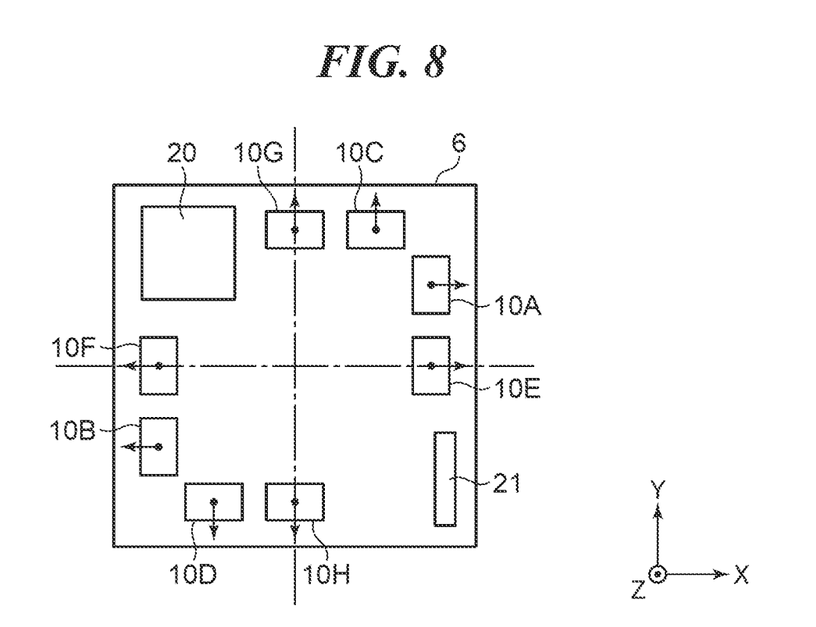
FIG. 8 is a plan view of a circuit board provided in the force sensor of FIGS. 6A and 6B.

FIG. 8 is a plan view of the circuit board 6 provided in the force sensor 100B. The displacement detection units 10A to 10H are mounted on the circuit board 6 so as to face the scales 4A to 4H in the Z direction. The displacement detection units 10A and 10B are away from each other by a predetermined distance in each of the X direction and the Y direction, and are disposed at positions that are point-symmetric with respect to the center of the XY plane of the force sensor 100B. The displacement detection direction for the displacement detection units 10A and 10B is in the X direction. Similarly, the displacement detection units 10C and 10D are away from each other by a predetermined distance in each of the X direction and the Y direction, and are disposed at positions that are point-symmetric with respect to the center of the XY plane of the force sensor 100B. The displacement detection direction for the displacement detection units 10C and 10D is in the Y direction.

When the force sensor 100B (circuit board 6) is divided into four quadrants by straight lines parallel to each of the X axis and the Y axis, where the straight lines pass through the center of the XY plane of the force sensor 100B, the displacement detection units 10A and 10C are disposed in the same quadrant, and the displacement detection units 10B and 10D are disposed in the same quadrant. It should be noted that the quadrant where the displacement detection units 10A and 10C are disposed and the quadrant where the displacement detection units 10B and 10D are disposed have the positional relationship in which they are point-symmetric with respect to the center of the XY plane of the force sensor 100B. Electrical components such as a signal processing circuit 20 and a connector 21 for outputting a signal from the signal processing circuit 20 are mounted in the quadrant where the displacement detection units 10A to 10D are not mounted. That is, as in the force sensor 100A, the force sensor 100B also has a high degree of freedom in component mounting on the circuit board 6 and enables component mounting with high density, so that the size and cost can be reduced.

The displacement detection direction of the displacement detection unit 10E is the X direction, the position of the displacement detection unit 10E is substantially the same as the displacement detection unit 10A in the X direction, and is away from the displacement detection unit 10A by a predetermined distance in the Y direction. The displacement detection direction of the displacement detection unit 10F is the X direction, the position of the displacement detection unit 10F is substantially the same as the displacement detection unit 10B in the X direction, and is away from the displacement detection unit 10B by a predetermined distance in the Y direction. The displacement detection units 10E and 10F are disposed on the same straight line parallel to the X axis.

The displacement detection direction of the displacement detection unit 10G is the Y direction, the position of the displacement detection unit 10G is substantially the same as the displacement detection unit 10C in the Y direction, and is away from the displacement detection unit 10C by a predetermined distance in the X direction. The displacement detection direction of the displacement detection unit 10H is the Y direction, the position of the displacement detection unit 10H is substantially the same as the displacement detection unit 10D in the Y direction, and is away from the displacement detection unit 10D by a predetermined distance in the X direction. The displacement detection units 10G and 10H are disposed on the same straight line parallel to the Y axis.

Next, arithmetic processing for detecting an external force by the force sensor 100B will be described. The force sensor 100B can detect the input six-axis external force components and the two-axis thermal expansion components. The six-axis external force components include the external force Fx in the X direction, the external force Fy in the Y direction, the external force Fz in the Z direction, the moment Mx about the X axis, the moment My about the Y axis, and the moment Mz about the Z axis. The two-axis thermal expansion components include a thermal expansion component Tx in the X direction and a thermal expansion component Ty in the Y direction. An 8×8 matrix Dmat putting the response to the inputs of the six-axis external force components and the two-axis thermal expansion components to the displacement unit 2 into one is expressed by the following [Math. 15]. According to the design in the present embodiment, when the unit of the amount of displacement is micrometers, the determinant of [Math. 15] is expressed by [Math. 16].

[Math. 15]

$$Dmat = \begin{bmatrix} Da\_Fx, & Da\_Fy, & Da\_Fz, & Da\_Mx, & Da\_My, & Da\_Mz, & Da\_Tx, & Da\_Ty \\ Db\_Fx, & Db\_Fy, & Db\_Fz, & Db\_Mx, & Db\_My, & Db\_Mz, & Db\_Tx, & Db\_Ty \\ Dc\_Fx, & Dc\_Fy, & Dc\_Fz, & Dc\_Mx, & Dc\_My, & Dc\_Mz, & Dc\_Tx, & Dc\_Ty \\ Dd\_Fx, & Dd\_Fy, & Dd\_Fz, & Dd\_Mx, & Dd\_My, & Dd\_Mz, & Dd\_Tx, & Dd\_Ty \\ De\_Fx, & De\_Fy, & De\_Fz, & De\_Mx, & De\_My, & De\_Mz, & De\_Tx, & De\_Ty \\ Df\_Fx, & Df\_Fy, & Df\_Fz, & Df\_Mx, & Df\_My, & Df\_Mz, & Df\_Tx, & Df\_Ty \\ Dg\_Fx, & Dg\_Fy, & Dg\_Fz, & Dg\_Mx, & Dg\_My, & Dg\_Mz, & Dg\_Tx, & Dg\_Ty \\ Dh\_Fx, & Dh\_Fy, & Dh\_Fz, & Dh\_Mx, & Dh\_My, & Dh\_Mz, & Dh\_Tx, & Dh\_Ty \end{bmatrix}$$

[Math. 16]

$$Dmat = \begin{bmatrix} 20 & 0 & 0 & 0 & -5 & -20 & 5 & 0 \\ -20 & 0 & 0 & 0 & 5 & -20 & 5 & 0 \\ 0 & 20 & 0 & 5 & 0 & 20 & 0 & 5 \\ 0 & -20 & 0 & -5 & 0 & 20 & 0 & 5 \\ 10 & 0 & -20 & 0 & 30 & 0 & 5 & 0 \\ -10 & 0 & -20 & 0 & -30 & 0 & 5 & 0 \\ 0 & 10 & -20 & -30 & 0 & 0 & 0 & 5 \\ 0 & -10 & -20 & 30 & 0 & 0 & 0 & 5 \end{bmatrix}$$

Therefore, the sign relationship of the outputs Da, Dc from the displacement detection units 10A and 10C and the sign relationship of the outputs Db, Dd from the displacement detection units 10B and 10D are reversed between when the moment Mz about the Z axis is input and when thermal expansion occurs. This makes it possible to separate them with a good SN ratio.

In addition, it is possible to accurately separate the thermal expansion component, so that the effect of thermal expansion can be corrected for components other than the moment Mz about the Z axis as explained below. That is, the calculation of the six-axis external force components and the two-axis thermal expansion components using the outputs Da to Dh from the displacement detection units 10A to 10H can be performed as shown in the following [Math. 17]. Here, the transformation matrix C is a matrix for transforming the outputs Da to Dh from the displacement detection units 10A to 10H into the six-axis external force components and the two-axis thermal expansion components. The transformation matrix C can be expressed as the following [Math. 18] by using the inverse matrix of Dmat shown in [Math. 16].

[Math. 17]

$$\begin{bmatrix} Fx \\ Fy \\ Fz \\ Mx \\ My \\ Mz \\ Tx \\ Ty \end{bmatrix} = C \times \begin{bmatrix} Da \\ Db \\ Dc \\ Dd \\ De \\ Df \\ Dg \\ Dh \end{bmatrix}$$

[Math. 18]

$$C = \begin{bmatrix} 0.0231 & -0.0231 & 0 & 0 & 0.0038 & -0.0038 & 0 & 0 \\ 0 & 0 & 0.0231 & -0.0231 & 0 & 0 & 0.0038 & -0.0038 \\ 0.0125 & 0.0125 & 0.0125 & 0.0125 & -0.0125 & -0.0125 & -0.0125 & -0.0125 \\ 0 & 0 & 0.0077 & -0.0077 & 0 & 0 & -0.0154 & 0.0154 \\ -0.0077 & 0.0077 & 0 & 0 & 0.0154 & -0.0154 & 0 & 0 \\ -0.0125 & -0.0125 & 0.0125 & 0.0125 & 0.125 & 0.0125 & -0.0125 & -0.0125 \\ 0.05 & 0.05 & 0.05 & 0.05 & 0.05 & 0.05 & -0.05 & -0.05 \\ 0.05 & 0.05 & 0.05 & 0.05 & -0.05 & -0.05 & 0.05 & 0.05 \end{bmatrix}$$

The outputs Da to Dh from the displacement detection units 10A to 10H when an independent external force in each axis direction is input to the force sensor 100B are set as an 8×8 matrix Dmat, multiplying the Dmat by the transformation matrix C, which gives a diagonal matrix expressed by the following [Math. 19] due to the nature of the inverse matrix.

[Math. 19]

$$C \times Dmat = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

Since the displacement detection units 10A to 10H detect extremely small displacements relative to the size of the force sensor 100B, the superposition approximation holds for the response to the external force input in each axial direction. Therefore, even when the eight components of the six-axis external force components and the two-axis thermal expansion components act in combination, the eight components can be separately detected as independent components. It should be noted that an epoxy resin with glass is often used for the circuit board 6. Since the epoxy resin with glass has generally anisotropy in the linear expansion coefficient, it is possible to independently obtain or separate the two-axis thermal expansion components, so that the temperature can be corrected for the thermal expansion independently in two axial directions. As described above, the force sensor 100B has a characteristic that the detected value of the external force is hardly affected by the temperature change.

Third Embodiment

Figure 9:
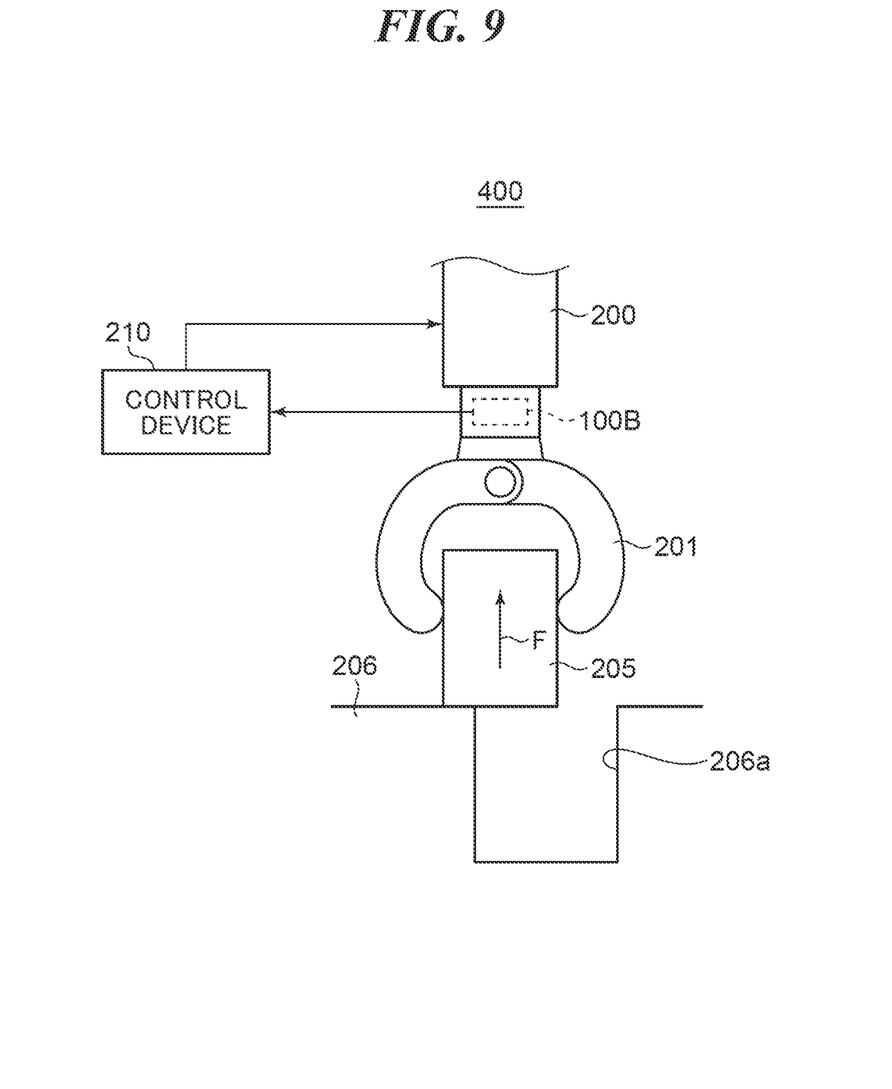
FIG. 9 is a side view showing a schematic configuration of a conveying apparatus.

Here, a conveying apparatus (a robot) including the force sensor 100B described in the second embodiment will be described. FIG. 9 is a side view showing a schematic configuration of a conveying apparatus 400. The conveying apparatus 400 includes a robot arm 200, the force sensor 100B, a gripping portion 201, and a control device 210.

The robot arm 200 is connected to another robot arm (not shown) or the like, and is one of movable portions that can move between predetermined positions. The gripping portion 201 is one of movable portions that can grip the conveyed object 205 by the closing operation and release the gripped conveyed object 205 by the opening operation. Here, the conveying apparatus 400 performs an operation in which the gripping portion 201 grips the conveyed object 205 at a predetermined position, and the gripped conveyed object 205 is inserted into a hole 206a formed in a substrate 206. The control device 210 controls the operation.

The force sensor 100B disposed between the robot arm 200 and the gripping portion 201 detects an upward external force F that the gripping portion 201 receives from the substrate 206 via the conveyed object 205. For example, when the conveyed object 205 is in contact with a portion other than the hole 206a on the upper surface of the substrate 206, since an external force acts on the force sensor 100B from the gripping portion 201, it is detected that the position of the conveyed object 205 is out of the position of the hole 206a. Therefore, the control device 210 controls the operation of the robot arm 200 so as to move the conveyed object 205 along the upper surface of the substrate 206. When the conveyed object 205 is located above the hole 206a, the external force acting on the force sensor 100B via the gripping portion 201 until then disappears, and accordingly it is detected that the position of the conveyed object 205 matches the position of the hole 206a. Then, the control device 210 controls the operation of the robot arm 200 so as to insert the conveyed object 205 into the hole 206a, and then controls the gripping portion 201 so that the conveyed object 205 is released.

As described above, in the conveying apparatus 400, the operation of the robot arm 200 can be controlled with high accuracy by using the force sensor 100B. It should be noted that the above-described force sensor according to the embodiment of the present invention can be used for various types of mechanical devices, other than the conveying apparatus 400, that control operations using the result of the external force detection.

Although the present invention has been described above on the basis of the preferred embodiments thereof, the present invention is not limited to these specific embodiments. Various embodiments within the scope not departing from the gist of the present invention are also included in the present invention. Furthermore, each of the above-described embodiments is merely an embodiment of the present invention, and the embodiments can be appropriately combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to realize a force sensor whose detected value is hardly affected by a temperature change.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A force sensor comprising:
a base unit;
a displacement unit configured to be displaced with respect to said base unit by receiving an external force;
a first displacement sensor pair including two sets of sensors that detect a relative displacement between said base unit and said displacement unit in a first direction; and
a second displacement sensor pair including two sets of sensors that detect a relative displacement between said base unit and said displacement unit in a second direction intersecting the first direction,
wherein among four quadrants divided by two straight lines along each of the first direction and the second direction, the straight lines passing through a midpoint of the two sets of sensors composing said first displacement sensor pair, the two sets of sensors composing said second displacement sensor pair are respectively disposed in two quadrants in which the two sets of sensors composing said first displacement sensor pair are respectively disposed, and
wherein the two sets of sensors composing said first displacement sensor pair are separated from each other by a predetermined distance in each of the first direction and the second direction, and the two sets of sensors composing said second displacement sensor pair are separated from each other by a predetermined distance in each of the first direction and the second direction.

2. The force sensor according to claim 1, wherein said each displacement sensor detects a relative displacement caused by a temperature change of said displacement unit.

3. The force sensor according to claim 1, wherein a midpoint of the two sets of sensors composing said first displacement sensor pair and a midpoint of the two sets of sensors composing said second displacement sensor pair are substantially coincident with each other.

4. The force sensor according to claim 1, wherein said each displacement sensor includes a displacement detection unit disposed on said base unit and a detection target object disposed on said displacement unit.

5. The force sensor according to claim 4, wherein the displacement detection unit optically detects a relative displacement of the detection target object.

6. The force sensor according to claim 4, wherein the displacement detection unit detects a relative displacement of the detection target object by detecting a change in capacitance between the displacement detection unit and the detection target object.

7. The force sensor according to claim 4, wherein the displacement detection unit detects a relative displacement of the detection target object by detecting a change in a magnetic field.

8. The force sensor according to claim 1, wherein elastic support units connecting said base unit and said displacement unit are disposed at four positions radially from the midpoint every 90 degrees so as to correspond to the straight lines dividing the four quadrants.

9. The force sensor according to claim 8, comprising:
detection target objects disposed, on the respective elastic support units disposed at four positions, symmetrically with respect to the midpoint; and
displacement detection units disposed on said base unit so as to face the detection target objects.

10. A device comprising:
a member; and
a force sensor configured to be attached to the member, the force sensor comprising:
a base unit;
a displacement unit configured to be displaced with respect to said base unit by receiving an external force;
a first displacement sensor pair including two sets of sensors that detect a relative displacement between said base unit and said displacement unit in a first direction; and
a second displacement sensor pair including two sets of sensors that detect a relative displacement between said base unit and said displacement unit in a second direction intersecting the first direction,
wherein among four quadrants of the force sensor, divided by two straight lines along each of the first direction and the second direction, the straight lines passing through a midpoint of the two sets of sensors composing said first displacement sensor pair, the two sets of sensors composing said second displacement sensor pair are respectively disposed in two quadrants in which the two sets of sensors composing said first displacement sensor pair are respectively disposed, and
wherein the two sets of sensors composing said first displacement sensor pair are separated from each other by a predetermined distance in each of the first direction and the second direction, and the two sets of sensors composing said second displacement sensor pair are separated from each other by a predetermined distance in each of the first direction and the second direction.

11. The device according to claim 10, wherein the member is a robot arm.

* * * * *